United States Patent
Dorsett et al.

[11] Patent Number: 6,015,115
[45] Date of Patent: Jan. 18, 2000

[54] INFLATABLE STRUCTURES TO CONTROL AIRCRAFT

[75] Inventors: Kenneth Merle Dorsett, Arlington; Christopher Sean Stewart, Fort Worth, both of Tex.

[73] Assignee: Lockheed Martin Corporation, Bethesda, Md.

[21] Appl. No.: 09/047,695

[22] Filed: Mar. 25, 1998

[51] Int. Cl.[7] .................................................. B64C 3/44
[52] U.S. Cl. .......................... 244/123; 244/219; 244/75 R
[58] Field of Search .......................... 244/219, 87, 90 R, 244/75 R, 123

[56] References Cited

U.S. PATENT DOCUMENTS

| | | |
|---|---|---|
| 2,937,826 | 5/1960 | Johnson . |
| 2,979,287 | 4/1961 | Ross . |
| 3,042,371 | 7/1962 | Fanti . |
| 3,118,639 | 1/1964 | Kiceniuk . |
| 3,136,501 | 6/1964 | Barber . |
| 3,158,338 | 11/1964 | Cushman . |
| 3,270,699 | 9/1966 | Bush . |
| 3,321,157 | 5/1967 | Turner . |
| 3,473,761 | 10/1969 | Chutter . |
| 3,586,267 | 6/1971 | Ingelman-Sundberg . |
| 3,957,232 | 5/1976 | Sebrell . |
| 3,962,506 | 6/1976 | Dunahoo . |
| 3,987,984 | 10/1976 | Fischer . |
| 4,582,278 | 4/1986 | Ferguson . |
| 4,858,854 | 8/1989 | Jacobson . |
| 5,244,169 | 9/1993 | Brown et al. . |
| 5,433,404 | 7/1995 | Ashill et al. . |
| 5,463,957 | 11/1995 | Jensen et al. . |
| 5,464,172 | 11/1995 | Jensen et al. . |

*Primary Examiner*—Charles T. Jordan
*Assistant Examiner*—Tien Dinh
*Attorney, Agent, or Firm*—James E. Bradley

[57] ABSTRACT

An inflatable structure to control aircraft and a method of modifying the shape of an aircraft airfoil before and during flight, which includes inflating or deflating at least one inflatable bladder positioned on an aircraft wing. The inflatable structures to control aircraft include an aircraft wing structure, at least one inflatable section positioned on an aircraft wing structure in at least one location selected from the group of an upper surface, a lower surface, a leading edge and a trailing edge of the aircraft wing structure. The inflatable section is provided for modifying the shape of the aircraft wing before or during flight for causing desired flight characteristics. An elastic wing skin is provided to cover the wing structure and the inflatable structures.

16 Claims, 5 Drawing Sheets ured radar
returns on vehicles having a low radar cross section. Radar
INFLATABLE STRUCTURES TO CONTROL AIRCRAFT

TECHNICAL FIELD OF THE INVENTION

The invention relates to aircraft wings having inflatable structures to provide aerodynamic control moments and aerodynamic camber variations. More specifically, this invention is directed to an aircraft airfoil having at least one inflatable structure that may be inflated to change the airfoil surface for lateral-directional, longitudinal or lift control.

BACKGROUND OF THE INVENTION

Traditionally, aircraft have been provided with rigid airfoils such as wings and tails that have a fixed cross section. Aircraft wings and tails typically have movable flight control surfaces. These flight control surfaces include flaps, elevators and rudders. They are connected by hinges to the respective wing or tail of the aircraft.

One problem with traditional aircraft wings and tails is that the airfoil thickness of aircraft designed for high speed flight must be determined by high speed flight considerations. The resulting thin wings and tails require complex high lift systems to enable the aircraft to fly at low speeds. An additional difficulty presented by traditional wing and tail designs is that control surfaces generate unwanted radar returns on vehicles having a low radar cross section. Radar returns primarily come from hinge lines, the edges of deflected control surfaces and the necessary gaps between the control surface and the fixed portion of the wing structure.

A further drawback with existing wing and tail airfoil designs is that mechanical flight control surfaces require mechanical or hydraulic servo actuators to deflect the control surfaces. Mechanical or hydraulic actuators add additional weight to the aircraft.

Consequently, a device to adjust the shape of an airfoil that does not generate unwanted radar returns and that reduces the weight of control surfaces of an aircraft is desired.

SUMMARY OF THE INVENTION

The invention includes an airfoil having inflatable structures to control an aircraft. For a wing airfoil, the wing structure has an upper surface, a lower surface, a leading edge and a trailing edge. At least one inflatable section is positioned on the aircraft wing structure in at least one location selected from the group of the upper surface, the lower surface, the leading edge and the trailing edge of the wing structure. A plurality of inflatable structures are positioned at the upper and lower surface of the aircraft wing structure. The inflatable structures may be deflated to produce a thin wing as required for high speed flight. Alternatively, inflatable sections positioned on the upper surface of the aircraft wing surface may be inflated to increase wing thickness for low speed flight. Additionally, inflatable sections positioned in or located near the leading edge area and/or trailing edge area of the wing may be selectively inflated or deflated to increase camber effects, including asymmetric inverted camber, as desired.

A high pressure jet of air, such as engine bleed air may be injected into air flow tangential to an inflatable flexible control surface to induce a coanda effect flow about the inflatable flexible control surface. Such an arrangement may increase the overall effectiveness of the inflatable flexible control surface to improve low speed lift and maneuvering performance of the aircraft.

DETAILED DESCRIPTION OF THE DRAWINGS

Figure 1:
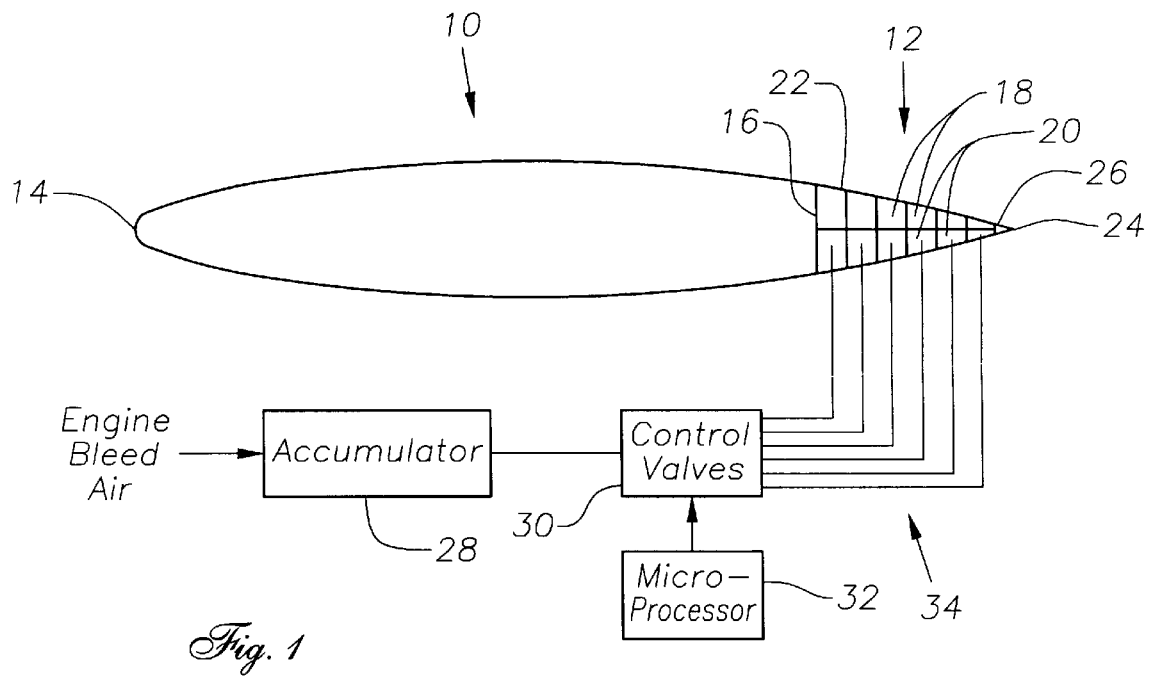
FIG. 1 is a side view of a wing having an inflatable trailing edge control surface and a schematic view of a pneumatic control system for supplying air pressure to the bladder within the trailing edge.

Referring to FIGS. 1–5, shown is an aircraft wing designated generally 10, which has inflatable trailing edge control surface designated generally 12. Wing 10 has leading edge 14 and rear spar 16. Inflatable trailing edge control surface 12 is affixed proximate rear spar 16. Inflatable trailing edge control surface 12 is constructed of a plurality of inflatable bladders, including upper inflatable bladders 18 and lower inflatable bladders 20. Inflatable trailing edge control surface 12 may be comprised of a plurality of inflatable bladders 18 and 20 or a single upper inflatable bladder 18 and a single lower inflatable bladder 20. Covering upper inflatable bladders 18 and lower inflatable bladders 20 is elastic skin 22. Inflatable bladders 18 and 20 are preferably connected to elastic skin 22 either by a mechanical means or with glue. Additionally, individual bladders 18 and 20 may be mechanically connected to one another or may be unconnected. Preferably, trailing edge 24 of inflatable trailing edge control surface 12 is provided with a structure 26 to support and provide an attachment point for elastic skin 22.

One method of inflating upper inflatable bladders 18 and lower inflatable bladders 20 is the use of engine bleed air. A control system is provided to direct engine bleed air into accumulator 24, which is operatively connected to a valve manifold housing control valves 30. Control valves 30 are selectively opened or closed by microprocessor 32. Control valves 30 allow pressurized air to enter into selected lines 34, which are connected to individual upper inflatable bladders 18 or lower inflatable bladders 20. Although the pneumatic control system described above is shown only with respect to FIG. 1, the system may be applied to any of the embodiments discussed herein.

Figure 2:
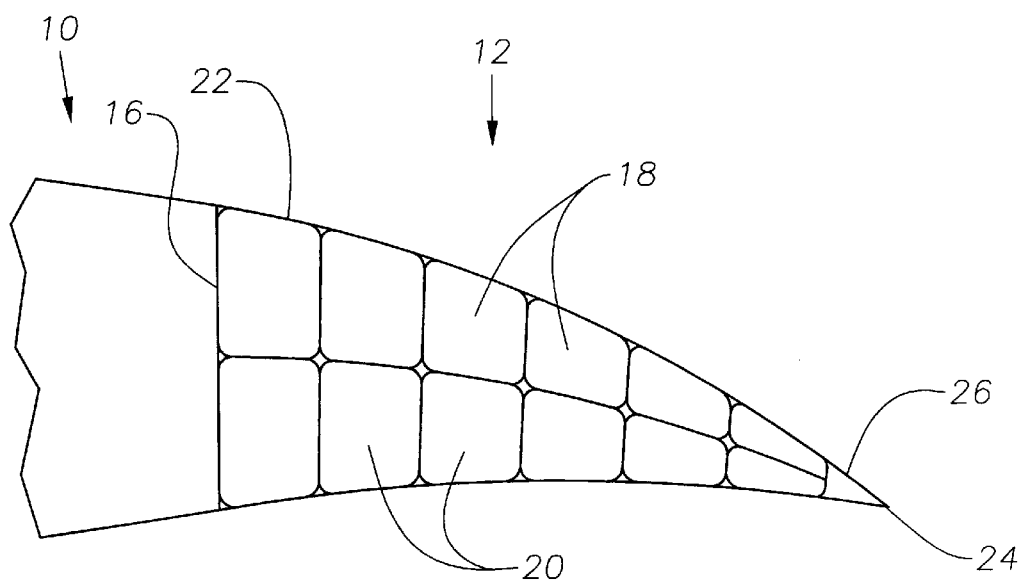
FIG. 2 is an enlarged view of the inflatable trailing edge control surface of FIG. 1 shown deflected downwardly.

When upper inflatable bladders 18 and lower inflatable bladders 20 are equally inflated, then inflatable trailing edge control surface 12 is not deflected. However, if lower inflatable bladders 20 are partially deflated while upper inflatable bladders 18 are inflated, then inflatable trailing edge control surface 12 deflects downwardly, as shown in FIG. 2.

Figure 3:
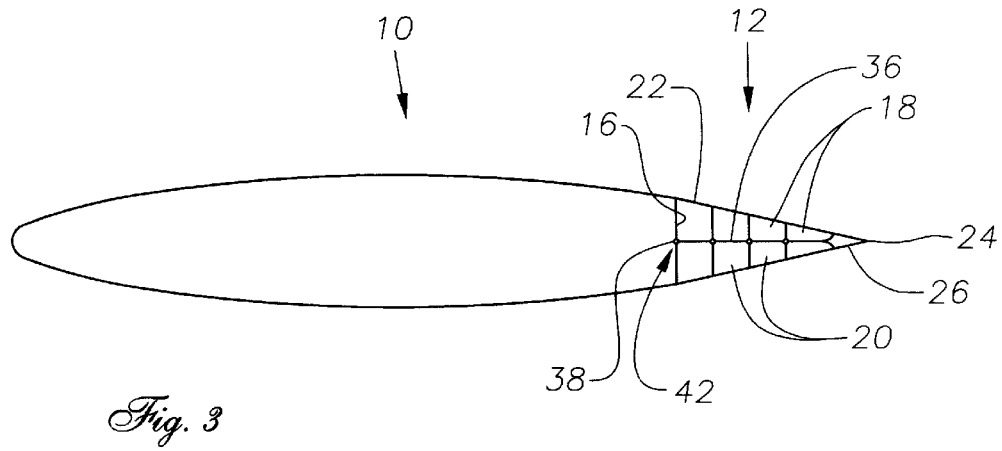
FIG. 3 is a side view of an aircraft wing having an inflatable trailing edge control surface with an integral jointed structural member.
Figure 4:
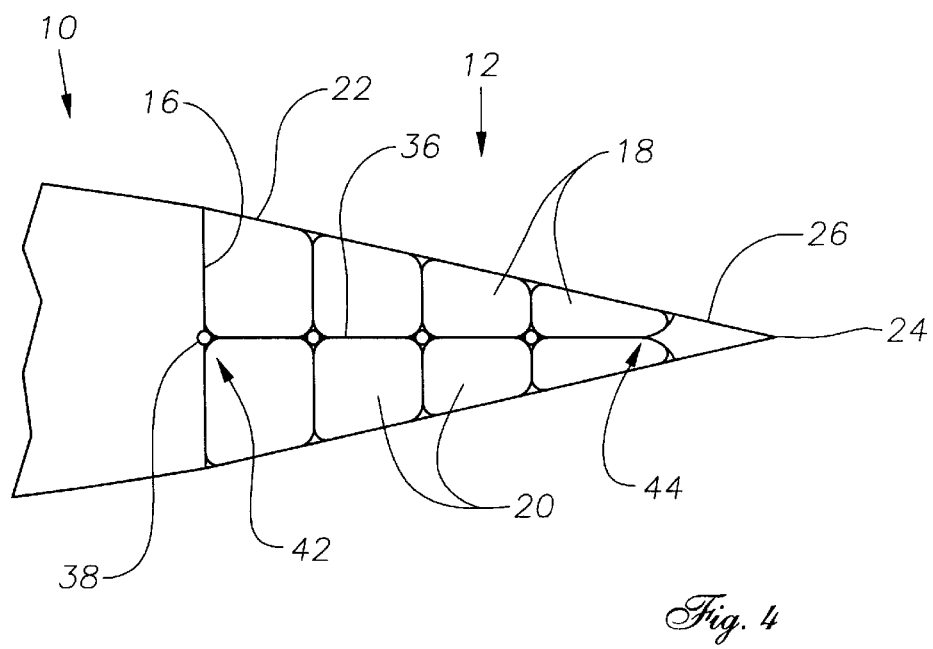
FIG. 4 is an enlarged view of the inflatable trailing edge control surface of FIG. 3 wherein upper and lower inflatable structures are inflated equally.
Figure 5:
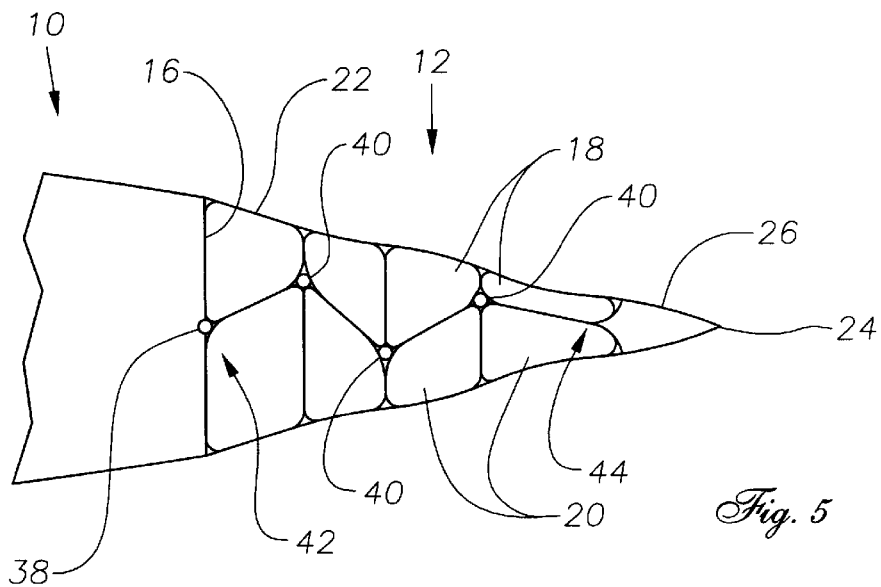
FIG. 5 is an enlarged view of the inflatable trailing edge control surface of FIG. 3 wherein the upper and lower bladders are deflated and the jointed structural member is partially collapsed.

To provide additional stiffness within inflatable trailing edge control surface 12, a structural member 36 may be provided spanning from rear spar 16 of wing 10 to support structure 26, as shown in FIG. 3. Structural member 36 is pivotally attached to rear spar 16 of wing 10 at pivot point 38 to accommodate an upward or downward deflection of inflatable trailing edge control surface 12. Structural member 36 may be provided with multiple joints 40 for additional flexibility, as can be most clearly seen in FIG. 5. If a jointed structural member 36 is provided, when upper inflatable bladders 18 and lower inflatable bladders 20 are equally deflated, the chord length of wing 10 may be shortened by allowing jointed structural member 36 to collapse as is shown in FIG. 5. Structural member 36 is shown affixed to rear spar 16 at pivot point 38 located at attached end 42. Affixed to distal end 44 is support structure 26. Although structural member 36 is shown affixed to rear spar 16 in inflatable trailing edge control surface 12 of wing 10, the inflatable control surface may also be positioned proximate leading edge 14 of wing 10.

Figure 6:
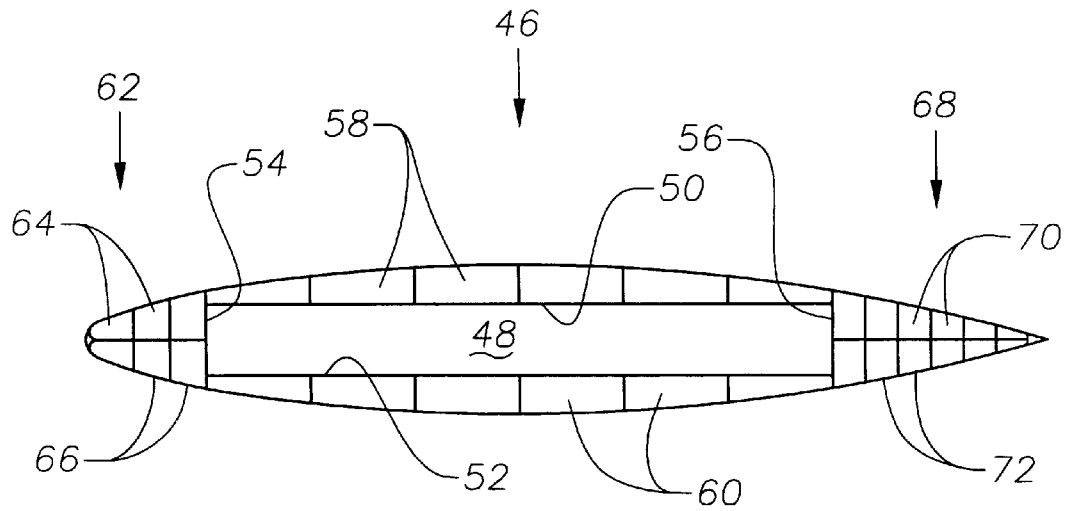
FIG. 6 is a side view of an aircraft wing having multiple bladders affixed thereto for modifying the shape of the aircraft wing.
Figure 7:
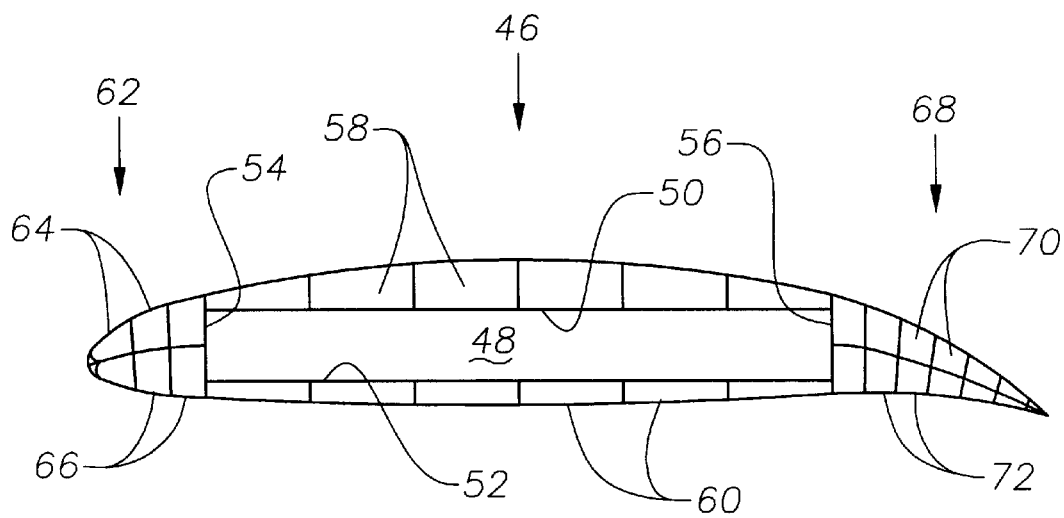
FIG. 7 is an aircraft wing having multiple inflatable bladders affixed thereto wherein lower bladders are deflated and upper bladders are inflated to create a wing having a high camber.

Referring now to FIGS. 6 and 7, shown is wing 46 having multiple inflatable surfaces. Wing 46 includes a wing box structure 48 having upper surface 50, lower surface 52, leading edge 54, and trailing edge 56. Affixed to upper surface 50 is a plurality of upper surface bladders 58. Similarly affixed to lower surface 52 is a plurality of lower surface bladders 60. Affixed proximate leading edge 54 of wing structure 48 are leading edge bladders 62. Preferably, leading edge bladders 62 are made up of upper leading edge bladders 64 and lower leading edge bladders 66. Similarly, trailing edge bladder 68 is affixed to wing structure 48 proximate trailing edge 56 of wing structure 48. Preferably, trailing edge bladders 68 include upper surface trailing edge bladders 70 and lower surface trailing edge bladders 72. The plurality of bladders or cells that make up upper surface bladders 58, lower surface bladders 60, leading edge bladders 62 and trailing edge bladders 68 are preferably bonded to one another but may be separate from one another.

The thickness of wing 46 from the upper side to the lower side may be controlled by selectively inflating or deflating upper surface bladders 58 and lower surface bladders 60. Similarly, the camber of wing 46 may be adjusted by inflating upper leading edge bladders 64 and upper trailing edge bladders 70 while simultaneously deflating lower leading edge bladders 66 and lower trailing edge bladders 72. The resulting effect is a downward deflection of the leading edge bladder 62 and the trailing edge bladder 68 as is shown in FIG. 7.

As shown in FIGS. 6 and 7, a pilot may control the shape of an aircraft wing by selectively inflating or deflating surface bladders by controlling upper surface bladders 58, lower surface bladders 60, leading edge bladders 62 and trailing edge bladders 68 by means of an accumulator, control valves, microprocessor and control lines as referred to in FIG. 1. For high speed flight, it is desirable to have a narrow wing. Therefore, for high speed flight, upper surface bladders 58 and lower surface bladders 60 are deflated to produce a thin wing. Additionally, to produce a desired camber for high speed flight, upper leading edge bladders 64, lower leading edge bladders 66, upper trailing edge bladders 70 and lower trailing edge bladders 72 are selectively inflated or deflated. For low speed flight, it is desirable for a pilot to increase wing thickness. Therefore, upper surface bladders 58 should be inflated. To control deflections and increase camber effects for low speed flight, pressure is selectively increased or decreased, in upper leading edge bladders 64, lower leading edge bladders 66, upper trailing edge bladders 70 and lower trailing edge bladders 72. Finally, to control roll of the aircraft, an asymmetric inverted camber may be induced in one of the wings. An asymmetric inverted camber may be achieved by deflating upper surface bladders 58 and inflating lower surface bladders 60 while deflating upper leading edge bladders 64 and upper trailing edge bladders 70 and inflating lower leading edge bladders 66 and lower trailing edge bladder 72.

Figure 8:
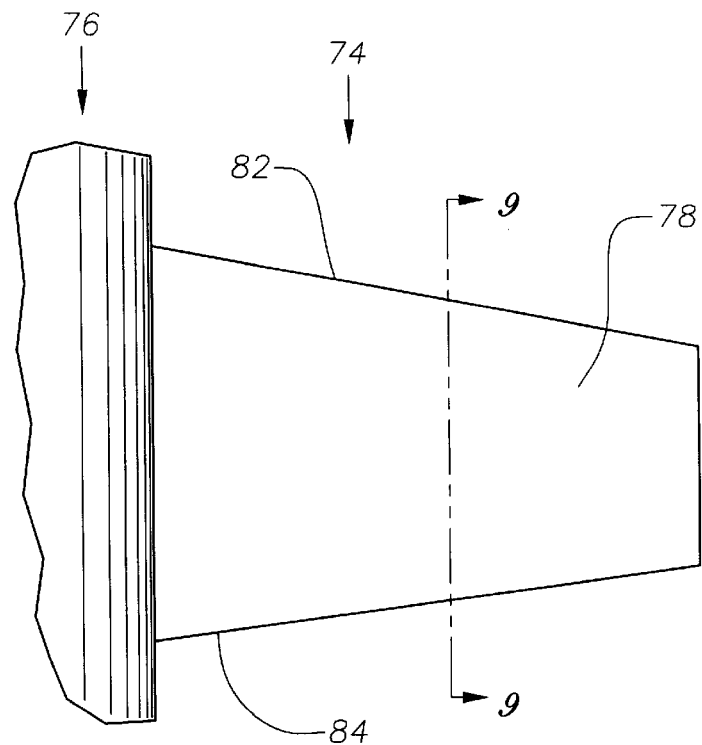
FIG. 8 is a top view of an aircraft wing.
Figure 9:
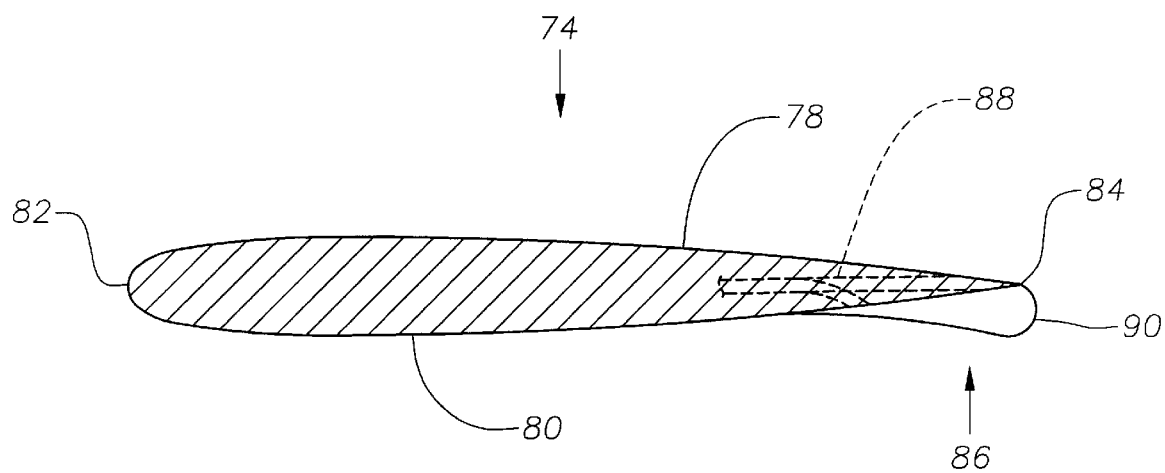
FIG. 9 is a side view of the aircraft wing of FIG. 8 taken along line 9—9 of FIG. 8 wherein the aircraft wing has an inflatable flexible control on a rear surface of the wing and a engine bleed air conduit.

Referring now to FIGS. 8 and 9, shown is a rigid wing structure 74 affixed to a fuselage 76. Rigid wing structure 74 has an upper surface 78, a lower surface 80, leading edge 82 and trailing edge 84. An inflatable, flexible control surface 86 may be positioned on rigid wing structure 74 to provide control to an aircraft. Inflatable flexible control surface 86 is preferably positioned proximate trailing edge 84 of rigid wing structure 74. Inflatable flexible control surface 86 is shown affixed to lower surface 80 proximate trailing edge 84 in FIG. 9. Inflatable flexible control surface 86 may be constructed of a single bladder or multiple bladders. By positioning an inflatable flexible control surface 86 proximate trailing edge 84 of rigid wing structure 74, mechanical control surfaces may be eliminated and replaced with inflatable flexible control surface 86 as shown in FIGS. 8 and 9.

By positioning inflatable flexible control surface 86 on lower surface 80 and providing an engine bleed air conduit 88 in rigid wing structure 74, a stream of engine bleed air may be directed over rear 90 of inflatable flexible control surface 86 for inducing a coanda effect, which improves control effectiveness as shown in FIG. 9. The coanda effect is a well-known phenomena that significantly increases the lift and control effectiveness of an airfoil, provided that there is sufficient flow turning. The inflatable flexible control surface 86 may be appropriately shaped to take advantage of the coanda effect, thereby increasing the overall effectiveness of control surface 86 and improving low speed lift and maneuvering performance of the aircraft. When inflatable flexible control surface 86 is not in use, pressure is relaxed within the inflatable control surface 86, which allows rigid wing structure 74 to be returned to the faired airfoil shape during high speed flight when low drag is desired.

In practice, a method of modifying the shape of an aircraft wing in flight may be achieved by inflating or deflating at least one inflatable section positioned on an aircraft wing. A wing such as rigid wing structure 74, as shown in FIGS. 8 and 9, may be provided with an inflatable flexible control surface 86, which provides control power without deflecting a mechanical trailing edge flap. Inflatable flexible control surface 86 takes the place of a conventional trailing edge control surface. When inflatable flexible control surface 86 is inflated on a lower surface of an airfoil, it generates an incremental increase in nose down pitching moment or rolling moment when inflated asymmetrically. Symmetric application will generate a pitching moment with no associated rolling moment. Inflation of inflatable flexible control surface 86 on upper surface 78 of wing 74 will have the opposite effect, that is a nose up control moment or rolling moment in the opposite direction will be generated. Sufficiently large contour changes on one wing will generate sizeable yawing moments through increased drag acting through a moment arm. In this manner, an aircraft can be controlled about all three axes without the need to deflect a mechanical control. However, this control concept lends itself best to longitudinal and lateral control.

By using an inflatable flexible control surface 86 along trailing edge 84 of wing 74, the invention behaves similarly to a gurney flap, which is a mechanical device that deflects ninety degrees to the wing chord line, thereby modifying the trailing edge kutta-condition and generating a control moment. The current invention accomplishes a similar action except that the flap and associated hinge mechanism is replaced by a flexible skin covering an inflatable flexible control surface 86 that may be selectively inflated to generate control moments.

Figure 10:
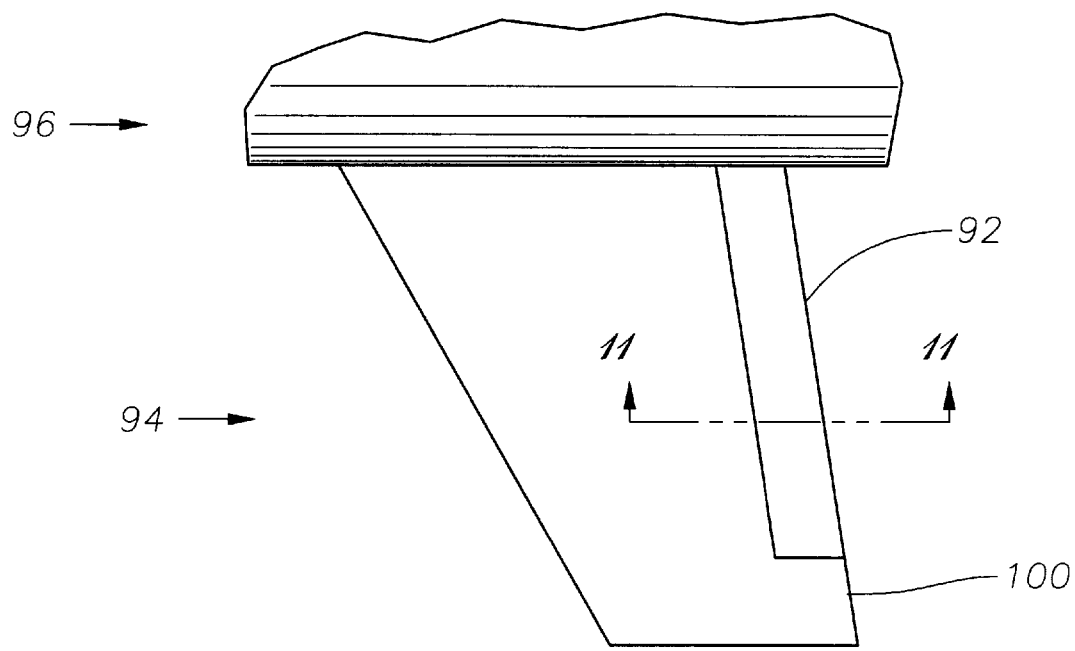
FIG. 10 is a top view of an aircraft wing constructed in accordance with another embodiment of he invention.
Figure 11:
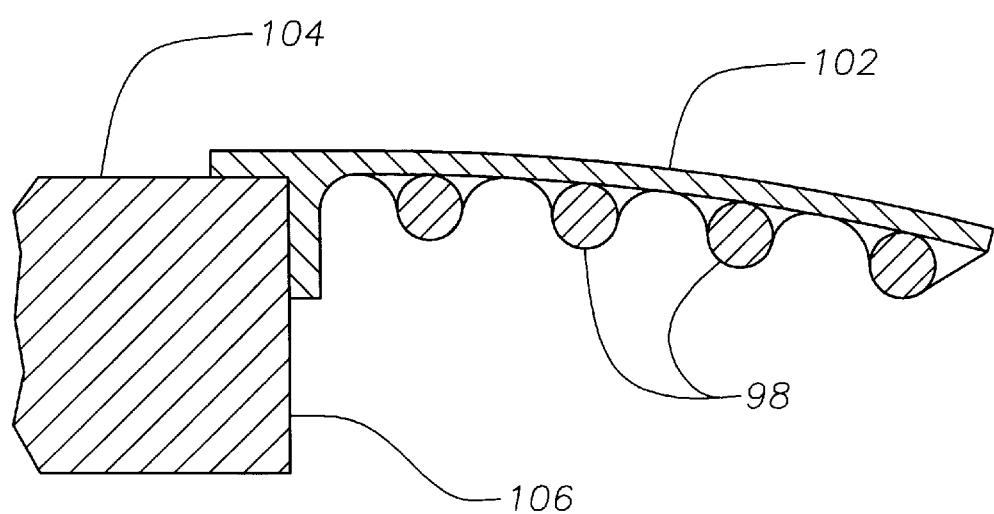
FIG. 11 is a cross-sectional view of the aircraft wing of FIG. 10 taken along line 11—11 in FIG. 10, showing a spanwise stiffened elastic wing skin.

Referring now to FIGS. 10 and 11, inflatable flexible control surface 92 is positioned on wing or airfoil 94, which is affixed to fuselage 96. Inflatable flexible wing control surface 92 is reinforced with stiffeners 98, which may be constructed of fiber rods or other materials so that inflatable flexible control surface 92 will expand only in a desired direction. In the case of inflatable flexible control surface 92, which is positioned parallel to trailing edge 100, stiffeners 98 are positioned parallel to each other and to trailing edge 100. As can be seen in FIG. 10, inflatable flexible control surface 92 may extend only partially over the length of trailing edge 100 of wing 94. A cross-section of a spanwise stiffened elastic wing skin 102 is shown in FIG. 11, which shows spanwise stiffened elastic wing skin 102 having a plurality of stiffeners 98 affixed thereto. The inflatable flexible surface 92 is inflated by single or multiple bladders similar to other embodiments discussed herein. Spanwise stiffened elastic wing skin 102 is shown positioned on upper surface 104 of rear spar 106.

The advantages associated with the applicant's invention are significant. The advantages include the ability to adjust the thickness of an airfoil for high speed or low speed flight rather than having to compensate for a fixed airfoil thickness determined by high speed flight. Additionally, the invention enables the elimination of hinge lines, edges and gaps that produce an undesirable radar signature.

Further, the elimination of mechanical control surfaces results in a reduction in hydraulic system requirements and therefore a reduction in control surface weight. The use of multiple bladders reduces the risk of catastrophic failure associated with the failure of a single bladder or air system. By using a system of multiple bladders, a wing surface may be continually adjusted for thickness and camber.

Although only the preferred embodiment of arrangements for carrying out this invention have been described above, it is not to be construed that the Invention is limited to such embodiments. Other modifications may be made by those skilled in the art without departing from the spirit and scope of the invention defined below.

We claim:

1. An airfoil for an aircraft, said airfoil having a leading edge and a trailing edge and comprising:
    a rigid structural member adapted to be stationarily mounted to the aircraft, said structural member having a leading side and a trailing side;
    at least one inflatable section located on one of said leading and trailing sides of said structural member and having a plurality of bladders mounted to said member;
    an elastic skin covering said member and said plurality of bladders in the inflatable section to define one of said leading and trailing edges;
    a control system for selectively inflating and deflating said bladders in said inflatable section independently from one another for modifying the shape of said elastic skin to cause desired flight characteristics; and
    wherein said plurality of bladders comprises at least one selectively inflatable upper bladder and at least one selectively inflatable lower bladder for controlling a deflection of said elastic skin, said inflatable section further comprising a movable structure member having a first end and a second end, said first end being attached to one of said leading and trailing edges of said airfoil, said second end being attached to said rigid structural member, said movable structure comprising a plurality of rigid sections connected together by joints to allow articulated movement of said movable structure member between said first and second ends to decrease the effective distance between said first and second end, thus changing an effective chord length of said airfoil.

2. An airfoil according to claim 1 wherein said control system comprises:
    an accumulator for receiving pressurized air;
    a valve manifold for selectively inflating said upper and lower bladders in said inflatable section via a control line in communication with said upper and lower bladders in said inflatable section; and
    a microprocessor for controlling said valve manifold.

3. An airfoil according to claim 1 wherein said said inflatable section is located at said trailing edge of said airfoil.

4. An airfoil according to claim 1 wherein said inflatable section is located at said leading edge of said airfoil.

5. An airfoil having a leading edge and a trailing edge and comprising:
    a rigid structural member having a leading side rearward of the leading edge and a trailing side forward of the trailing edge;
    at least one inflatable section mounted to one of said sides of said rigid structural member, wherein said inflatable section is comprised of a plurality of upper bladders that have side walls joined to each other, and a plurality of lower bladders having upper walls joined to lower walls of said upper bladders, said lower bladders further having side walls joined to each other;
    an elastic wing skin covering said structural member and said inflatable section ta define said one of said leading and trailing edges; and
    a control system for selectively inflating said up and lower bladders to define an inflated initial configuration and at least partially deflating individual ones of said bladders while keeping others of said bladders inflated for causing an edge portion of said elastic skin to selectively bend downward from the initial configuration and thus change the shape of said airfoil to cause desired flight characteristics.

6. An airfoil according to claim 5 wherein said inflatable section further comprises a plurality of stiffeners spaced apart and mounted to an interior surface of said elastic skin transversely to a desired bending direction for preventing said inflatable section from expanding in a selected direction.

7. An airfoil according to claim 5 wherein
    said control system comprises:
    an accumulator for receiving pressurized air;
    a valve manifold for selectively inflating said upper and lower bladders via control lines in communication with individual ones of said bladders; and
    a microprocessor for controlling said valve manifold.

8. An airfoil according to claim 5 wherein selectively inflating said upper bladders and selectively deflating at least some of said lower bladders with said control system causes a downward bend of said elastic skin.

9. An airfoil according to claim 5 wherein said inflatable section further comprises a movable structure member having a first end and a second end, said first end being attached to one of said leading and trailing edges of said wing, and said second end being attached to said rigid structural member, said movable structure comprising a plurality of rigid sections connected together by joints to allow articulated movement of said movable structure member between said first and second ends to increase and decrease the effective distance between said first and second ends, thus changing an effective chord length of said airfoil.

10. An airfoil according to claim 5 wherein:

said inflatable section is mounted on said trailing edge of said airfoil; and said airfoil further comprises an engine bleed air conduit leading to an exterior surface of said airfoil forward of said inflatable section for directing a stream of engine bleed air over a rear portion of said inflatable section.

11. A method of modifying a shape of an aircraft airfoil in flight comprising the steps of:

mounting within said airfoil at least one inflatable section having a plurality of upper and lower bladders covered by an elastic skin to define selectively a leading edge or a trailing edge of said airfoil, the upper bladders being located above and having lower sides joined to upper sides of the lower bladders;

inflating at least some of said upper and lower bladders to achieve an inflated initial configuration of said elastic skin; then selectively deflating at least some of the lower bladders while maintaining the inflation of at least some of the upper bladders in said inflatable section to cause an edge portion of said elastic skin to bend downwardly to modify the shape of said airfoil.

12. The method of modifying the shape of an aircraft airfoil according to claim 11 further comprising the step of restraining said inflating and deflating in a selected dimension with stiffeners mounted to an interior side of said elastic skin transversely to a direction of said bend of the elastic skin.

13. The method of modifying the shape of an aircraft airfoil according to claim 11 wherein paid trailing edge is defined by said step of mounting at least one inflatable section within said airfoil.

14. The method of modifying the shape of an aircraft airfoil according to claim 11 wherein said leading edge is defined by said step of mounting at least one inflatable section within said airfoil.

15. The method of modifying the shape of an aircraft airfoil according to claim 11 wherein said step of mounting at least one inflatable section comprises mounting said inflatable section within said trailing edge of said airfoil and wherein the method further comprises:

injecting a high pressure jet of engine bleed air into air flow tangential to and in contact with an upper surface of said elastic skin of said inflatable section for inducing a coanda effect.

16. The method of modifying the shape of an aircraft airfoil according to claim 11 wherein the step of changing said inflation comprises at least partially deflating at least some of said lower bladders while keeping said upper bladders inflated.

* * * * *